US008926149B2

(12) United States Patent
Bingle (10) Patent No.: US 8,926,149 B2
(45) Date of Patent: Jan. 6, 2015

(54) SIDE-VIEW MIRROR ASSEMBLY WITH SELECTIVELY ILLUMINATING PORTION

(75) Inventor: Rob Bingle, Walker, MI (US)

(73) Assignee: ADAC Plastics, Inc., Grand Rapids, MI (US)

( * ) Notice: Subject to any disclaimer, the term of this patent is extended or adjusted under 35 U.S.C. 154(b) by 149 days.

(21) Appl. No.: 13/166,510

(22) Filed: Jun. 22, 2011

(65) Prior Publication Data

US 2012/0020100 A1 Jan. 26, 2012

Related U.S. Application Data

(60) Provisional application No. 61/357,316, filed on Jun. 22, 2010.

(51) Int. Cl.
*B60Q 1/26* (2006.01)
*B60R 1/12* (2006.01)
*B60R 1/06* (2006.01)

(52) U.S. Cl.
CPC ............. *B60R 1/06* (2013.01); *B60Q 1/2665* (2013.01); *B60R 1/1207* (2013.01)
USPC ........... 362/484; 362/546; 362/540; 362/543; 362/135; 362/240

(58) Field of Classification Search
CPC ........ B60Q 1/2665; B60Q 1/38; B60Q 1/323; B60Q 3/023; B60R 1/1207; B60R 1/12; B60R 1/07
USPC ......... 362/494, 545, 800, 540, 543, 555, 135, 362/140, 240
See application file for complete search history.

(56) References Cited

U.S. PATENT DOCUMENTS

| 2001/0024371 | A1* | 9/2001 | Pastrick et al. | 362/494 |
| 2002/0171954 | A1* | 11/2002 | Bonardi et al. | 359/877 |
| 2003/0206417 | A1* | 11/2003 | Pastrick et al. | 362/494 |
| 2004/0022065 | A1* | 2/2004 | Assinder et al. | 362/494 |
| 2004/0208015 | A1* | 10/2004 | Boddy et al. | 362/494 |
| 2005/0190465 | A1* | 9/2005 | Henion et al. | 359/864 |
| 2005/0201113 | A1* | 9/2005 | Tuttle et al. | 362/494 |
| 2005/0281043 | A1* | 12/2005 | Eisenbraun | 362/494 |
| 2011/0221588 | A1* | 9/2011 | Foote et al. | 340/465 |

* cited by examiner

*Primary Examiner* — Anh Mai
*Assistant Examiner* — Kevin Quarterman
(74) *Attorney, Agent, or Firm* — Dickinson Wright PLLC (57) ABSTRACT

A side-view mirror assembly for a vehicle, the side-view mirror assembly comprising: a housing for securement to a side of a vehicle, the housing defining an internal cavity opening toward a rear of the housing; a mirror disposed in the internal cavity, the mirror comprising a reflective element substantially occupying and being visible through the opening of the housing, and the reflective element supported on a first surface of a backplate, the backplate including at least one light-transmissive portion positioned proximate a peripheral edge of the reflective element; and one or more light sources disposed within the housing and operable to selectively illuminate the at least one light-transmissive portion so that the illumination is visible from outside the side-view mirror assembly in an area defined between the peripheral edge of the reflective element and the opening of the housing.

31 Claims, 5 Drawing Sheets

SIDE-VIEW MIRROR ASSEMBLY WITH SELECTIVELY ILLUMINATING PORTION

CROSS-REFERENCE TO RELATED APPLICATIONS

This application is related to, and claims the benefit of priority from, prior-filed U.S. Provisional Application Ser. No. 61/357,316, filed 22 Jun. 2010, the disclosure of which is incorporated herein by reference in its entirety.

FIELD OF THE INVENTION

The present disclosure relates generally to side-view mirrors for motor vehicles, and more specifically to lighting features for such side-view mirrors.

BACKGROUND

Side-view mirrors for vehicles have heretofore been modified with lighting features such as turn-signal indicators that illuminate when the driver actuates the vehicle's turn signals. Typically, these lighting features, which enhance safety for the driver as well as other motorists in the vicinity, are visible from the rear (i.e., from behind the position of the driver) of the vehicle. However, these and other prior art lighting features are relatively complex in their construction; and so there continues to exist a need for side-view mirror lighting features that are relatively economical to build while also having utility and pleasing aesthetics.

SUMMARY

The specification discloses a side-view mirror assembly for a vehicle, the side-view mirror assembly comprising: a housing for securement to a side of a vehicle, the housing defining an internal cavity opening toward a rear of the housing; a mirror disposed in the internal cavity, the mirror comprising a reflective element substantially occupying and being visible through the opening of the housing, and the reflective element supported on a first surface of a backplate, the backplate including at least one light-transmissive portion positioned proximate a peripheral edge of the reflective element; and one or more light sources disposed within the housing and operable to selectively illuminate the at least one light-transmissive portion so that the illumination is visible from outside the side-view mirror assembly in an area defined between the peripheral edge of the reflective element and the opening of the housing.

Per one feature, the one or more light sources are operatively connectable to a controller programmed so as to selectively illuminate the one or more light sources in response to the occurrence of one or more predefined activities. The one or more predefined activities may be selected from the group consisting of detecting an object within a predetermined distance from the vehicle, detecting an object within a blindspot of the vehicle locking of the vehicle, locking of the vehicle, unlocking of the vehicle, braking of the vehicle, acceleration of the vehicle, opening of the trunk of the vehicle, starting the vehicle, activation of a turn signal of the vehicle, detection of a remote control unit for the vehicle within a predetermined distance from the vehicle, and activation of a remote control unit for the vehicle.

In one embodiment, the backplate is formed of a light-transmissive material which defines the at least one light-transmissive portion.

In another embodiment, the at least one light-transmissive portion comprises one or more light pipes disposed on the backplate.

Per one feature, the at least one light-transmissive portion is positioned proximate substantially the entire peripheral edge of the reflective element.

According to still another feature, the at least one light-transmissive portion comprises two or more light-transmissive portions positioned proximate discrete portions of the peripheral edge of the reflective element, and the one or more light sources comprises two or more light sources. Further, each of the two or more light-transmissive portions are at least selectively illuminated by a different one of the two or more light sources. Per this feature, each of the two or more light sources may emit light of a different color from the other light sources.

Per still another feature, the inventive side-view mirror assembly comprises a controller disposed in the housing, the controller being operatively connectable to a controller for the vehicle and programmed so as to selectively illuminate the at least one light source in response to indication by the controller for the vehicle that the one or more of the predefined activities has occurred. The one or more light sources may, furthermore, comprise two or more light sources, each light source emitting light of a different color from the other light sources. For each of the one or more predefined activities, the controller is programmed to effect selective illumination of the two or more light sources to illuminate the at least one light-transmissive portion in one of the different colors. Alternatively, or in addition, the one or more light sources comprise at least one light source capable of selectively emitting light of different colors, each light source emitting light of a different color from the other light sources. For each of the one or more predefined activities, the controller is programmed to effect selective illumination of the at least one light source to illuminate the uncovered, light-transmissive portion in one of the different colors.

BRIEF DESCRIPTION OF THE DRAWINGS

For a better understanding of the present invention and to show more clearly how it may be carried into effect, reference will now be made, by way of example, to the accompanying drawings, in which.

DESCRIPTION

As required, a detailed description of an exemplary embodiment of the present invention is disclosed herein. However, it is to be understood that the disclosed embodiments are merely exemplary of the invention, which may be embodied in various and alternative forms. The accompanying drawings are not necessarily to scale, and some features may be exaggerated or minimized to show details of particular components. Therefore, specific structural and functional details disclosed herein are not to be interpreted as limiting, but merely as providing a representative basis for teaching one skilled in the art to variously employ the present invention.

Referring now to the drawings, wherein like numerals refer to like or corresponding parts throughout the several views, the present invention may seen to generally comprise a side-view mirror assembly for a vehicle, including: a housing for securement to a side of a vehicle, the housing defining an internal cavity opening toward a rear of the housing; a mirror disposed in the internal cavity, the mirror comprising a reflective element substantially occupying and being visible through the opening of the housing, and the reflective element supported on a first surface of a backplate, the backplate including at least one light-transmissive portion positioned proximate a peripheral edge of the reflective element; and one or more light sources disposed within the housing and operable to selectively illuminate the at least one light-transmissive portion so that the illumination is visible from outside the side-view mirror assembly in an area defined between the peripheral edge of the reflective element and the opening of the housing.

Referring to FIGS. 1 through 5 more particularly, there is illustrated a side-view mirror assembly 10 for a vehicle according to an exemplary embodiment of the present invention, the side-view mirror assembly comprising a housing 11 securable to a side of a vehicle (partially shown at 1, depicting a portion of a vehicle door), via a side-view mirror mount 2. The housing 11 defines an internal cavity 12 opening toward a rear of the housing and in which is disposed a mirror 15 in the internal cavity, the mirror comprising a reflective element 16 supported on a first surface of a backplate 20, the backplate 20 including at least one light-transmissive portion 21 positioned proximate a peripheral edge 17 of the reflective element 16; and one or more light sources (not shown) disposed within the housing 11 and operable to illuminate the at least one light-transmissive portion 21 so that the illumination is visible from outside the side-view mirror assembly in an area 12 defined between the peripheral edge of the reflective element 16 and the housing.

The light source is connectable (such as via cables 30, as shown) extending through the mount 2 to a controller (not shown) of a vehicle so as to emit light when instructed by the controller.

The housing 11, which may be manufactured from, for instance, a polymer such as, without limitation, ABS plastic, generally forms a shell and defines the cavity for receiving components of mirror 15, including any electronic and mechanical components associated with the mirror 15, such as a motor or microcontroller connected to mirror 15 that pivots or moves mirror 15 in response to an electrical signal from the vehicle controller or other remote control. Per convention, the vehicle will usually include a manual mechanical or electrical control mechanism (not shown) on an interior of the vehicle and within comfortable reach of an occupant of the vehicle. Generally, the controls for the mirror 15 are within convenient reach of the vehicle's driver. Housing 11 may be monolithic or a unit comprised of multiple components.

Mirror 15 is sized and shaped to fit within the internal cavity 12 so as to leave a gap between the peripheral edge of the reflective element 16 and the housing 11. According to the exemplary embodiment, the reflective element 16 comprises a reflective surface disposed on glass, the foregoing unit mounted on the backplate 20.

As noted, the backplate 20 includes at least one light-transmissive portion 21 positioned proximate the peripheral edge 17 of the reflective element 16. According to one embodiment, the backplate 20 may be constructed, in whole or in part, of a transparent or translucent material, such as a clear or transparent resin, to define the at least one light-transmissive portion 21. Alternatively, or in addition, the at least one light-transmissive portion 21 can be defined by one or more light pipes, light guides, fiber optic lighting fibers, and/or other such conventional means disposed on the backplate 20 and positioned proximate the peripheral edge of the reflective element 16.

Figure 1:
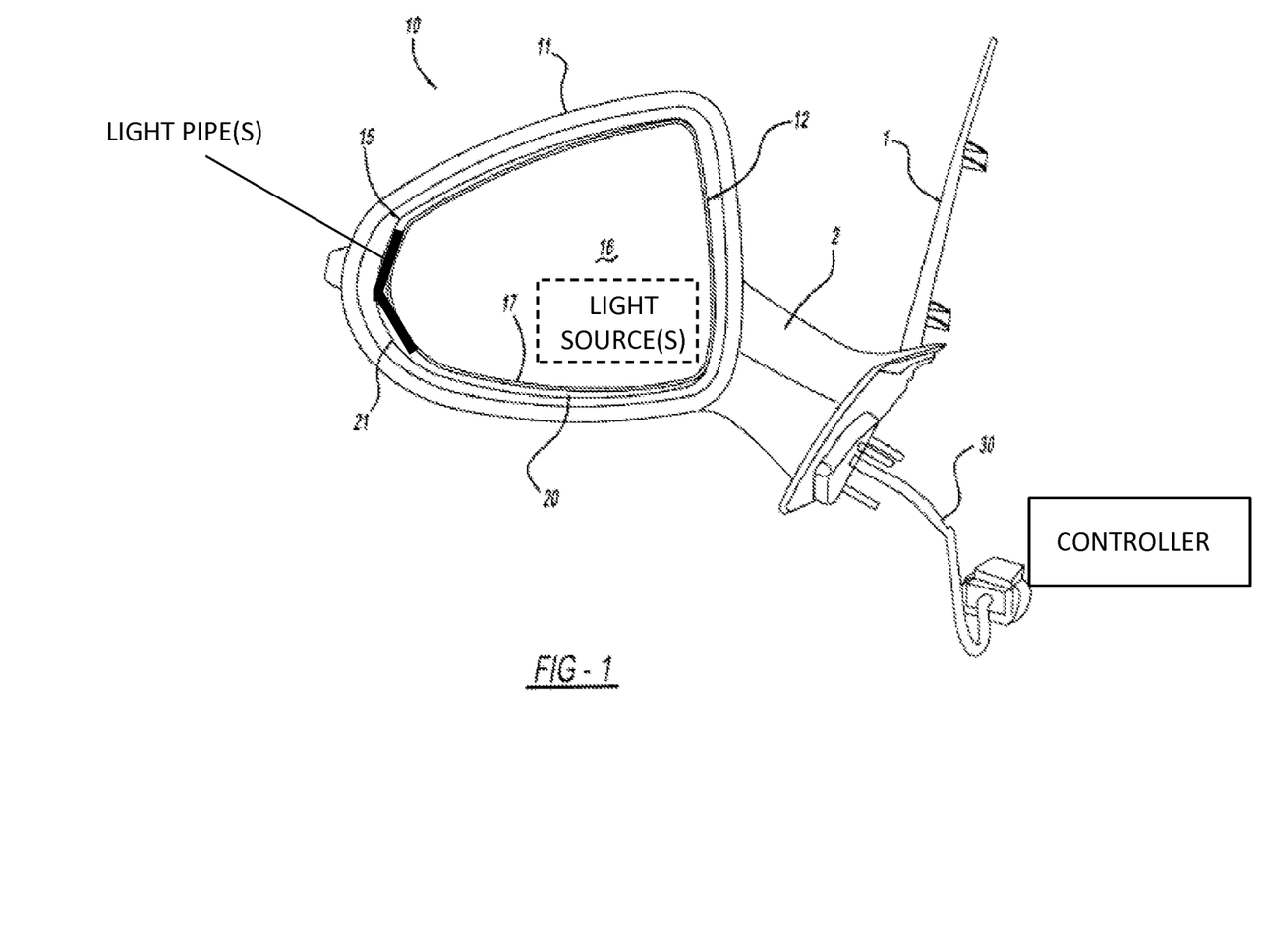
FIG. 1 illustrates an example exterior side-view mirror assembly according to the present disclosure.
Figure 2:
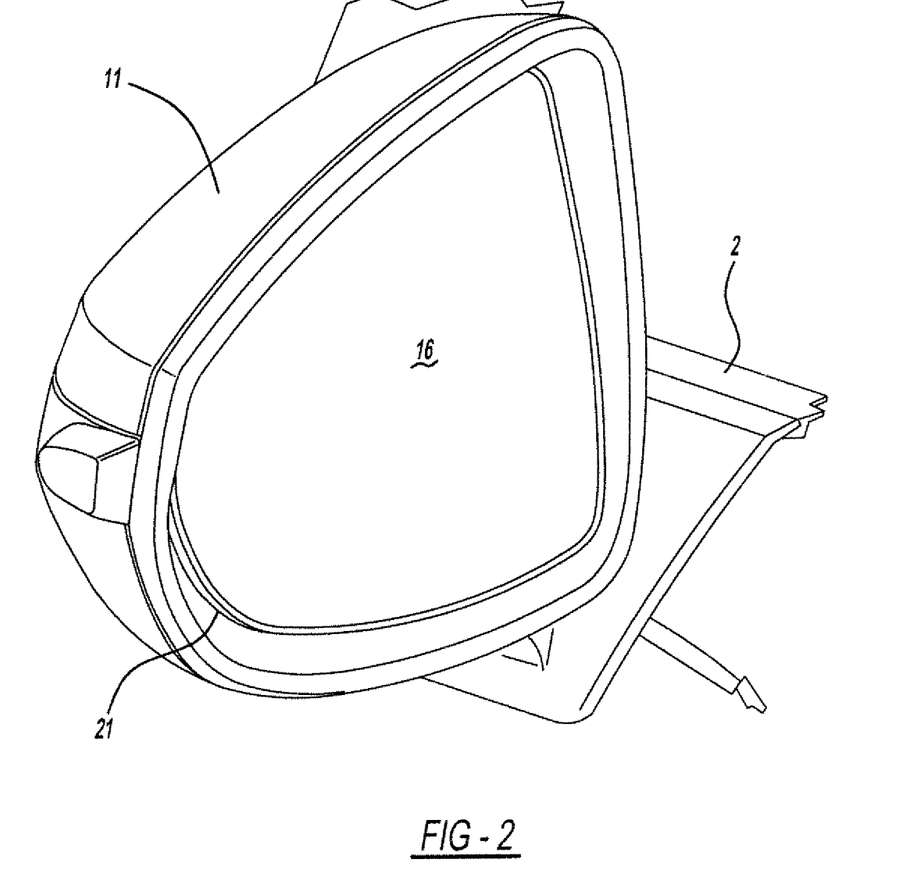
FIG. 2 illustrates a perspective view of the mirror assembly of FIG. 1.
Figure 3:
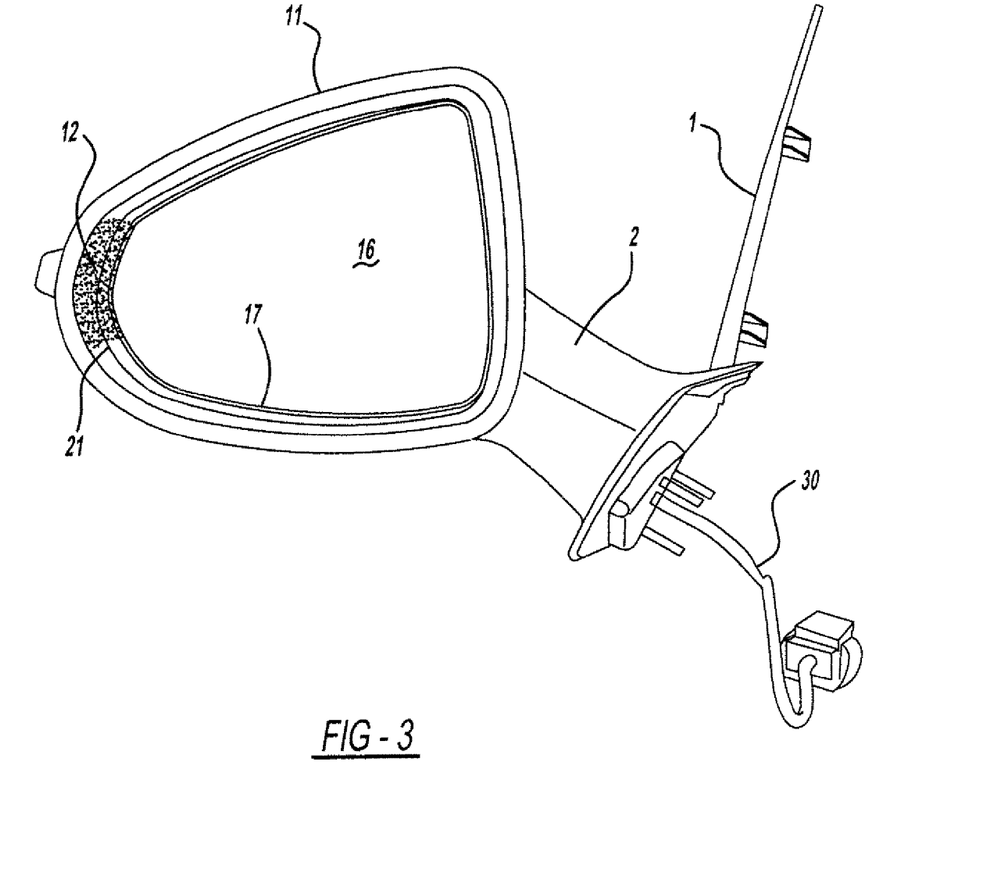
FIG. 3 illustrates in example yellow colored light illumination of a mirror assembly according to the present disclosure.
Figure 4:
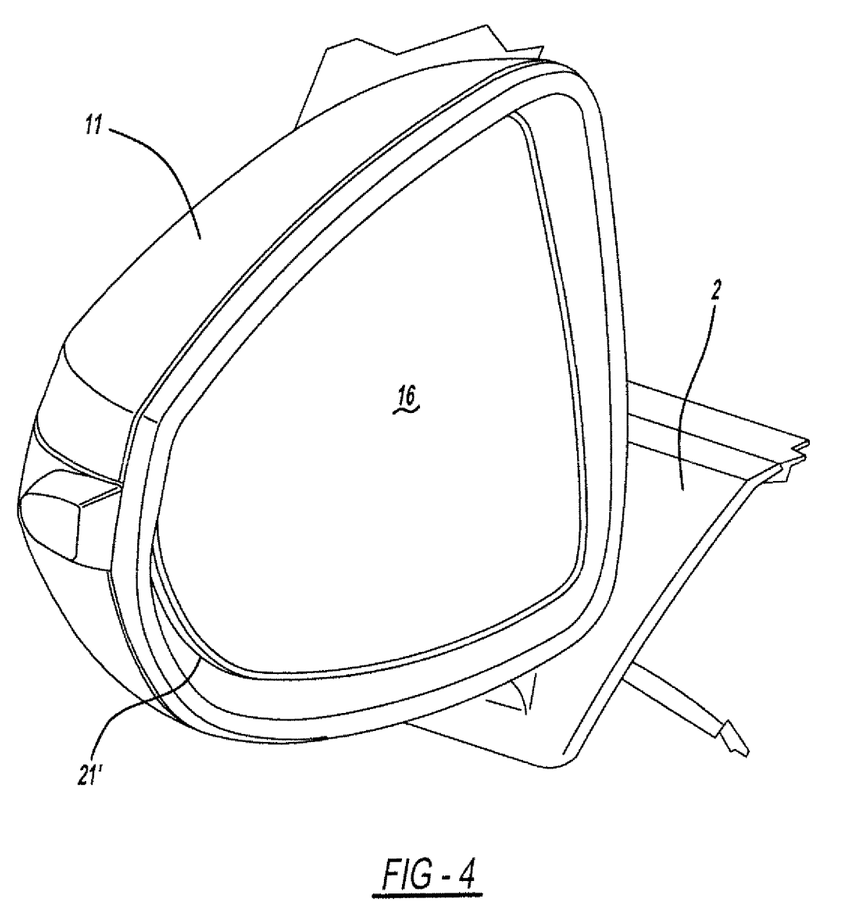
FIG. 4 illustrates in example red colored light illumination of a mirror assembly according to the present disclosure.
Figure 5:
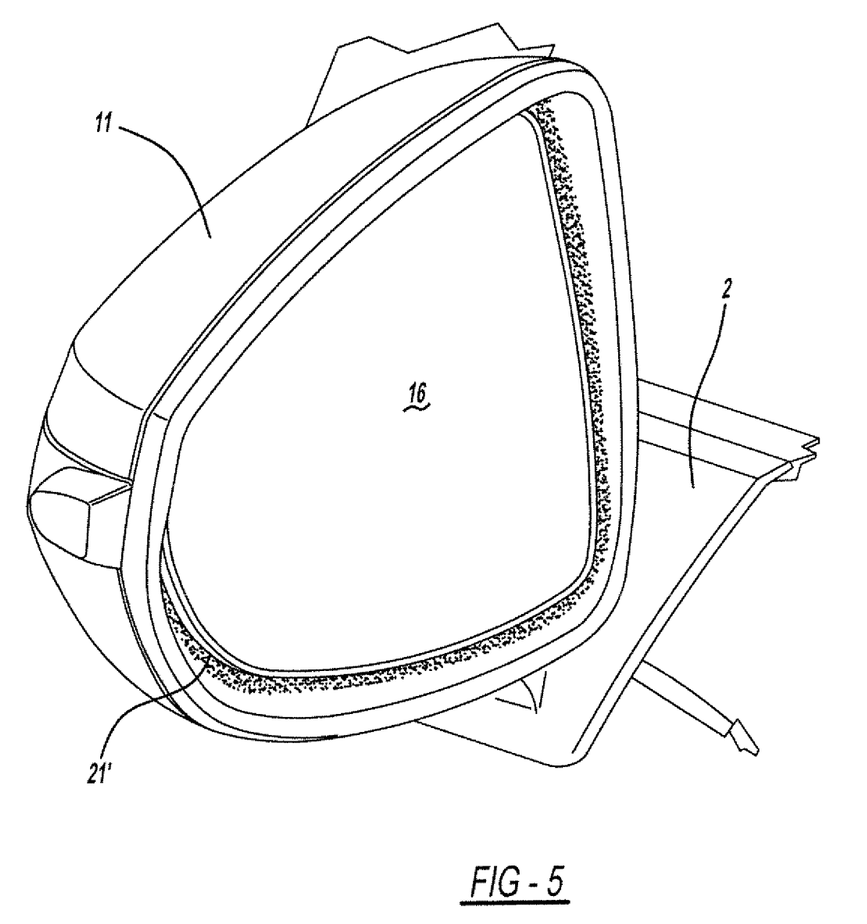
FIG. 5 illustrates in example green colored partial light illumination of a mirror assembly according to the present disclosure.

As shown, the at least one light-transmissive portion may comprise two or more light-transmissive portions 21, 21', each positioned proximate discrete portions of the peripheral edge of the reflective element 16 (in the illustrated embodiment, light-transmissive portion 21 is disposed proximate the left-hand, outboard edge of reflective element (see FIG. 3); and light-transmissive portion 21 is disposed proximate the bottom and right-hand edges of the reflective element (see FIGS. 4 and 5). As explained further below, these light-transmissive portions are adapted to be selectively illuminated by the one or more light sources.

The one or more light sources illuminate the light-transmissive portion or portions 21, 21', etc. in response to one or more predefined vehicle activities. Exemplary activities include, by way of example and not limitation, detecting an object within a predetermined distance from the vehicle, detecting an object within a blindspot of the vehicle locking of the vehicle, unlocking of the vehicle, braking of the vehicle, acceleration of the vehicle, opening of the trunk of the vehicle, starting the vehicle, activation of a turn signal of the vehicle, detection of a remote control unit for the vehicle within a predetermined distance from the vehicle, and activation of a remote control unit for the vehicle.

The one or more light sources may optionally be operatively coupled to a controller, such as a printed circuit board (PCB) disposed in housing 11. Controller may be a controller in communication (such as via cables 30 extending through mount 2) with a vehicle controller and programmed, in response to signals from the vehicle controller, to selectively illuminate the light source or light sources so as to illuminate the light-transmissive portion (or portions, where two or more such light-transmissive portions (e.g., 21, 21', are provided), or illuminate the same light-transmissive portion, in the appropriate color, for the predefined vehicle activity indicated by the vehicle controller. Controller may, as noted, alternatively be the vehicle controller itself, the vehicle controller being programmed as described above.

The one or more light sources may, by way of example, comprise one or more LEDs coupled, per convention, to the light-transmissive portion or portions, such as the one or more light pipes and/or the light-transmissive portion or portions defined integrally with the backplate. Alternatively, or in addition, the one or more light sources may comprise other conventional light sources such as, without limitation, electroluminescent (EL) light sources, organic light-emitting diodes (OLEDs), incandescent light sources, etc. Likewise, light guides, fiber optic lighting fibers, and other such conventional means may be used instead of, or in addition to, a light pipe in the exemplary embodiment.

The one or more light sources can include a plurality of different colored lights. Accordingly, different colored illuminations, whether of the same and/or different light-transmissive portions, can be effected responding to different signals from the controller corresponding to different vehicle activities. Alternatively, or in addition, such multi-color illumination may be accomplished by individual light sources each capable of selectively producing illumination in two or more colors (such as, for instance, RGB LEDs).

FIGS. 3 through 5 illustrate exemplary illuminations of the light-transmissive portions 21, 21' resulting from different vehicle activities. As noted, vehicle activities can include object detection. For example, selective illumination of light-transmissive portion 21 can be effected when an object is present within a predetermined space or region around the vehicle, such as a blindspot, or within a predetermined distance from the vehicle, such as within a predetermined distance from a rear bumper of the vehicle, as shown in FIG. 3. If a vehicle is present in the predetermined space or region, the controller will effect illumination of the light-source to illuminate the light-transmissive portion 21 in a particular color. The color can be any visible (including to the occupant of the vehicle) color, such as, by way of example only, yellow (shown in FIG. 3 by stippled shading).

In a further example, the vehicle activity effecting illumination of the light-transmissive portion or portions 21' includes locking and/or unlocking a door of the vehicle. In the case, different colored lights are provided, each being selectively illuminated to illuminate the light-transmissive portion 21' in response to the occurrence of one or the predefined vehicle activities. The illumination can be colored red for locking, as shown in FIG. 4 by the area of stippled shading. When the vehicle is unlocked, the illumination can be green, as shown in FIG. 5 by the area of stippled shading. In these examples, the illumination occurs through substantially the entire light-transmissive portion 21'.

A further activity can include effecting illumination of the light-transmissive portion in response to activation of a vehicle's turn signal.

According to another embodiment, the lighting feature can further be activated to illuminate the light-transmissive portion in, for instance, blue or white colored light, as courtesy lights.

It will be appreciated from the above disclosure that the present invention provides freedom to add aesthetic lighting features without the visible lenses and light sources being revealed, thus improving on prior art side-view mirror assemblies.

The foregoing description of the exemplary embodiment of the invention has been presented in order to explain the principles of the innovation and its practical application so as to enable one skilled in the art to utilize the innovation. It is not intended to be exhaustive of, or to limit the invention to, the precise forms disclosed, and although only an exemplary embodiment of the present invention has been described in detail in this disclosure, those skilled in the art who review this disclosure will readily appreciate that many modifications are possible without materially departing from the novel teachings and advantages of the subject matter herein recited. Other substitutions, modifications, changes and omissions may be made in the exemplary embodiment without departing from the spirit of the present invention and, accordingly, all such modifications, changes, etc. are intended to be included within the scope of the invention as hereinafter claimed.

The invention in which an exclusive property or privilege is claimed is defined as follows:

1. A side-view mirror assembly for a vehicle, comprising:
   a housing for securement to a side of a vehicle, the housing defining an internal cavity opening toward a rear of the housing;
   a side-view mirror disposed in the internal cavity, the side-view mirror comprising a reflective element substantially occupying and being visible through the opening of the housing so as to permit the viewing of objects by a vehicle occupant, and the reflective element supported on a first surface of a backplate, the backplate including at least one light-transmissive portion positioned proximate a peripheral edge of, and extending about a majority of the perimeter of, the reflective element; and
   one or more light sources disposed within the housing; and
   wherein the side-view mirror assembly is characterized by each of an illuminated state, in which at least one of the one or more light sources illuminates the at least one light-transmissive portion so that the illumination is visible from outside the side-view mirror assembly in an area defined between the peripheral edge of the reflective element and the opening of the housing, and a non-illuminated state, in which no illumination is visible from outside the side-view mirror assembly in the area defined between the peripheral edge of the reflective element and the opening of the housing.

2. The side-view mirror assembly of claim 1, wherein the one or more light sources are operatively connectable to a controller programmed so as to selectively illuminate the one or more light sources in response to the occurrence of one or more predefined activities.

3. The side-view mirror assembly of claim 2, wherein the one or more predefined activities are selected from the group consisting of detecting an object within a predetermined distance from the vehicle, detecting an object within a blindspot of the vehicle locking of the vehicle, locking of the vehicle, unlocking of the vehicle, braking of the vehicle, acceleration of the vehicle, opening of the trunk of the vehicle, starting the vehicle, activation of a turn signal of the vehicle, detection of a remote control unit for the vehicle within a predetermined distance from the vehicle, and activation of a remote control unit for the vehicle.

4. The side-view mirror assembly of claim 1, wherein the backplate is monolithic, and is formed of a light-transmissive material defining the at least one light-transmissive portion.

5. The side-view mirror assembly of claim 1, wherein the at least one light-transmissive portion comprises one or more light pipes disposed on the backplate.

6. The side-view mirror assembly of claim 1, wherein the at least one light-transmissive portion is positioned proximate substantially the entire perimeter of the reflective element.

7. The side-view mirror assembly of claim 1, wherein the at least one light-transmissive portion comprises two or more light-transmissive portions positioned proximate discrete portions of the peripheral edge of the reflective element, the one or more light sources comprises two or more light sources, and wherein further each of the two or more light-transmissive portions are at least selectively illuminated by a different one of the two or more light sources.

8. The side-view mirror of claim 7, wherein each of the two or more light sources emits light of a different color from the other light sources.

9. The side-view mirror assembly of claim 1, comprising a controller disposed in the housing, the controller being operatively connectable to a controller for the vehicle and programmed so as to selectively illuminate the at least one light source in response to indication by the controller for the vehicle that the one or more of the predefined activities has occurred.

10. The side-view mirror assembly of claim 9, wherein the one or more light sources comprises two or more light sources, each light source emitting light of a different color from the other light sources.

11. The side-view mirror assembly of claim 10, wherein, for each of the one or more predefined activities, the controller is programmed to effect selective illumination of the two or more light sources to illuminate the at least one light-transmissive portion in one of the different colors.

12. The side-view mirror assembly of claim 11, wherein the at least one light-transmissive portion is positioned proximate substantially the entire perimeter of the reflective element.

13. The side-view mirror assembly of claim 11, wherein the controller is a printed circuit board electronically connectable to the controller for the vehicle.

14. The side-view mirror assembly of claim 11, wherein the one or more light sources comprise one or more LEDs.

15. The side-view mirror assembly of claim 11, wherein the backplate is monolithic, and is formed of a light-transmissive material defining the at least one light-transmissive portion.

16. The side-view mirror assembly of claim 11, wherein the at least one light-transmissive portion comprises one or more light pipes disposed on the backplate.

17. The side-view mirror assembly of claim 11, wherein the one or more predefined activities are selected from the group consisting of detecting an object within a predetermined distance from the vehicle, detecting an object within a blindspot of the vehicle locking of the vehicle, locking of the vehicle, unlocking of the vehicle, braking of the vehicle, acceleration of the vehicle, opening of the trunk of the vehicle, starting the vehicle, activation of a turn signal of the vehicle, detection of a remote control unit for the vehicle within a predetermined distance from the vehicle, and activation of a remote control unit for the vehicle.

18. The side-view mirror assembly of claim 10, wherein the at least one light-transmissive portion comprises two or more light-transmissive portions positioned proximate discrete portions of the peripheral edge of the reflective element, and wherein, for each of the one or more predefined activities, the controller is programmed to effect selective illumination of the two or more light sources to illuminate at least one of the two or more light-transmissive portions in one of the different colors.

19. The side-view mirror assembly of claim 18, wherein the controller is a printed circuit board electronically connectable to the controller for the vehicle.

20. The side-view mirror assembly of claim 18, wherein the one or more light sources comprise one or more LEDs.

21. The side-view mirror assembly of claim 18, wherein the backplate is formed of a light-transmissive material which defines the at least one light-transmissive portion.

22. The side-view mirror assembly of claim 18, wherein the at least one light-transmissive portion comprises one or more light pipes disposed on the backplate.

23. The side-view mirror assembly of claim 18, wherein the one or more predefined activities are selected from the group consisting of detecting an object within a predetermined distance from the vehicle, detecting an object within a blindspot of the vehicle locking of the vehicle, locking of the vehicle, unlocking of the vehicle, braking of the vehicle, acceleration of the vehicle, opening of the trunk of the vehicle, starting the vehicle, activation of a turn signal of the vehicle, detection of a remote control unit for the vehicle within a predetermined distance from the vehicle, and activation of a remote control unit for the vehicle.

24. The side-view mirror assembly of claim 9, wherein the one or more light sources comprise at least one light source capable of selectively emitting light of different colors, each light source emitting light of a different color from the other light sources.

25. The side-view mirror assembly of claim 24, wherein, for each of the one or more predefined activities, the controller is programmed to effect selective illumination of the at least one light source to illuminate the uncovered, light-transmissive portion in one of the different colors.

26. The side-view mirror assembly of claim 1, wherein the backplate is at least partially formed of a light-transmissive material at least a portion of which includes the at least one light-transmissive portion.

27. The side-view mirror assembly of claim 11, wherein the backplate is at least partially formed of a light-transmissive material at least a portion of which includes the at least one light-transmissive portion.

28. The side-view mirror assembly of claim 18, wherein the backplate is at least partially formed of a light-transmissive material at least a portion of which includes the at least one light-transmissive portion.

29. A side-view mirror assembly for a vehicle, comprising:
a housing for securement to a side of a vehicle, the housing defining an internal cavity opening toward a rear of the housing;
a side-view mirror disposed in the internal cavity, the side-view mirror comprising a selectively moveable reflective element substantially occupying and being visible through the opening of the housing so as to permit the viewing of objects by a vehicle occupant, and the reflective element supported on a first surface of a backplate which is selectively moveable in conjunction with the reflective element, the backplate including two or more light-transmissive portions positioned proximate discrete portions of a peripheral edge of the reflective element;
two or more light sources disposed within the housing, each of the two or more light-transmissive portions being selectively illuminable by a different one of the two or more light sources; and
wherein the side-view mirror assembly is characterized by each of an illuminated state, in which at least one of the light-transmissive portions is illuminated by one of the light sources so that the illumination is visible from outside the side-view mirror assembly in an area defined between the peripheral edge of the reflective element and the opening of the housing, and a non-illuminated state, in which no illumination is visible from outside the side-view mirror assembly in the area defined between the peripheral edge of the reflective element and the opening of the housing.

30. A side-view mirror assembly for a vehicle, comprising:
a housing for securement to a side of a vehicle, the housing defining an internal cavity opening toward a rear of the housing;
a side-view mirror disposed in the internal cavity, the side-view mirror comprising a reflective element substantially occupying and being visible through the opening of the housing so as to permit the viewing of objects by a vehicle occupant, and the reflective element supported on a first surface of a monolithic backplate formed of a light-transmissive material and defining at least one light-transmissive portion positioned proximate a peripheral edge of the reflective element;
one or more light sources disposed within the housing; and
wherein the side-view mirror assembly is characterized by each of an illuminated state, in which at least one of the one or more light sources illuminates the at least one light-transmissive portion so that the illumination is visible from outside the side-view mirror assembly in an area defined between the peripheral edge of the reflective element and the opening of the housing, and a non-illuminated state, in which no illumination is visible from outside the side-view mirror assembly in the area defined between the peripheral edge of the reflective element and the opening of the housing.

31. A side-view mirror assembly for a vehicle, comprising:

a housing for securement to a side of a vehicle, the housing defining an internal cavity opening toward a rear of the housing;

a side-view mirror disposed in the internal cavity, the side-view mirror comprising a reflective element substantially occupying and being visible through the opening of the housing so as to permit the viewing of objects by a vehicle occupant, and the reflective element supported on a first surface of a backplate, the backplate including at least one light-transmissive portion positioned immediately adjacent a peripheral edge of the reflective element; and one or more light sources disposed within the housing; and wherein the side-view mirror assembly is characterized by each of an illuminated state, in which at least one of the one or more light sources illuminates the at least one light-transmissive portion so that the illumination is visible from outside the side-view mirror assembly in an area defined between the peripheral edge of the reflective element and the opening of the housing, and a non-illuminated state, in which no illumination is visible from outside the side-view mirror assembly in the area defined between the peripheral edge of the reflective element and the opening of the housing.

\* \* \* \* \*